Aug. 18, 1970 G. E. RICKERT 3,524,710

SELF-LUMINOUS REFLEX SIGHT

Filed Jan. 19, 1967

INVENTOR

GLENN E. RICKERT

United States Patent Office 3,524,710
Patented Aug. 18, 1970

3,524,710
SELF-LUMINOUS REFLEX SIGHT
Glenn E. Rickert, Community State Bank Bldg.,
Huntington, Ind. 46750
Continuation-in-part of application Ser. No. 447,483, Apr. 12, 1965. This application Jan. 19, 1967, Ser. No. 610,302
Int. Cl. G02b 23/10, 27/34
U.S. Cl. 356—251                                       5 Claims

ABSTRACT OF THE DISCLOSURE

A reflex sight having a highly efficient beam splitter is disclosed which beam splitter is effective to combine a target view and a collimated image of a sight indicia for alignment purposes. The improved beam splitter may be of a high efficiency dichroic interference type coating, may have any other reflective coating and arranged to have a ratio of reflection to transmission which is different in one area as compared to another area, or may be of the dichroic type and having areas of different reflectivity.

---

Figure 1:
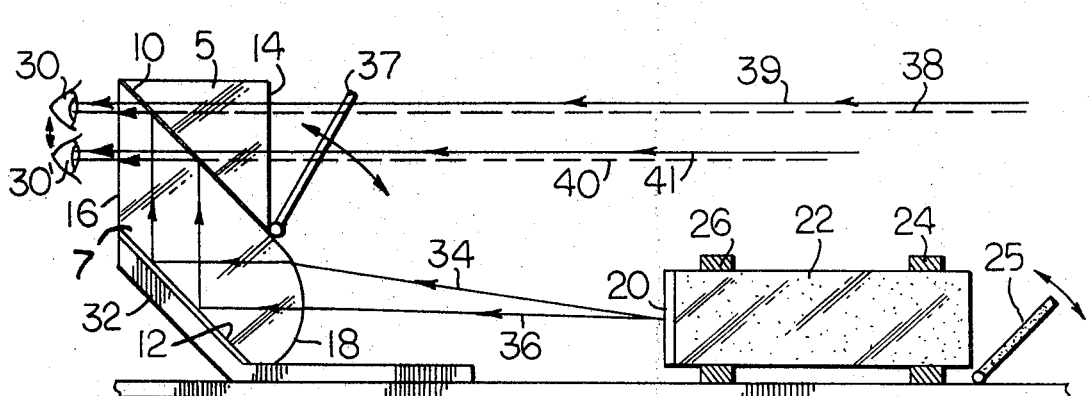

A gun sight having a collimated image of a self luminous reticle reflected from a semi-transparent mirror, through which mirror the target is seen. The proportionate brightness of target and reticle is controlled, in adverse light conditions, by employing a target brightness filter, a multi-intensity semi-transparent mirror beam splitter, and atomic energy powered phosphorescent material.

This application is a continuation-in-part of co-pending applications, Ser. No. 447,483 filed Apr. 12, 1965, and Ser. No. 445,574 filed Apr. 5, 1965, now United States Pat. No. 3,439,970 dated Apr. 22, 1969 which in turn are continuations-in-part of Ser. No. 356,403 filed Apr. 1, 1964, now abandoned, which in turn was a continuation-in-part of Ser. No. 2,701 filed Jan. 15, 1960, now abandoned. This application is also a part of co-pending application Ser. No. 311,790 filed Sept. 26, 1963, now United States Pat. No. 3,320,671, issued May 23, 1967.

This invention relates to collimated aiming devices and more particularly to collimated beam splitters, or so-caled reflex gun sights.

Reflux sights have been known for a number of years. Their design generally employs the reflection of a reticle from a semi-transparent mirror surface through which mirror the target is also viewed. A collimator is employed to cause a reticle image to appear at or near infinity, parallax-free, and in focus with the target. The collimator may be a refracting lens in the system or the semi-transparent mirror may be concave instead of flat so that it collimates the reticle as it reflects it.

Reflex sights to be practical, even in daytime use, generally require an electrical lighted recticle.

Reflex sights for portable firearms, such as shotguns and rifles where lights and bulky electrical accessories are not desirable, have not been generally accepted for the simple reason that they fail when subjected to the various light conditions encountered in daytime hunting or combat.

The semi-transparent mirrors used in reflex sights transmit a percentage of the target light and reflect a percentage of the reticle light, the sum of which for a given frequency is not over 100%. That is to say, for example, if they transmit 70% of the target light, they reflect no more than 30% of the same frequency in reticle light, thus totaling 100% efficiency, but no more. These mirrors are sometimes called beam splitters.

If a semi-transparent mirror is chosen of a sufficiently high reflection character to permit seeing the reticle against the sky, then the mirror does not transmit sufficient target light to permit seeing dimly lighted targets. If a mirror is chosen for somewhat dark targets, that mirror will then not permit seeing the reticle against bright targets. This limitation is the reason reflex sights have had to resort to very bright reticles as provided by electrical illumination to be practical even in daytime general use. An electrical reostat is frequently used to vary the reticle brightness.

A primary object of the invention is to provide a reflex sight with a particularly brilliant self luminuos reticle so as to provide a reflex sight having a minimum loss of target brightness such as to make the sight practical under minimum target brightness conditions.

A further object of the invention is to provide a reflex sight in which the observer can instantly control the brightness relationship between the target and the reticle, whereby the reticle remaining discernable against very bright target conditions.

An important object of the invention is to not only provide a sight usable under all daytime conditions, but to also provide a sight having an auxiliary energy light source to make it useful for nighttime aiming.

A major object of the invention is to not only provide a highly accurate sight without magnification of the target, but to also provide a sight having target magnification capability.

In my invention, I provide an especially brilliant self-luminous reticle illuminator employing fluorescent material of a vivid color that causes the reticle to stand out against the normal shooting target background. In addition, I provide a reticle having light transmitting indicia on a dark, low reflectance face. The face is especially made dark and low in reflectance to prevent unwanted mirror reflections from the reticle face which would otherwise confuse the observer and reduce the contrast and discernment of the target. This combination constitutes the invention of a reflex sight of much higher efficiency than has been taught in the prior art without the use of electrical illumination.

Three additional features of the invention make it useful under very extreme conditions. The first is a special multi-intensity semi-transparent mirror coating provided to reflect the reticle marks. This semi-transparent mirror or beam splitter is especially constructed to have a ratio of reflectance to transmission in one area that is different than the ratio in another area. The mirror is so designed that the observer can quickly move to the area having the ratio of reflectance to transmission that permits him to clearly discern both the reticle and the target. If the target is very bright, he moves to an area having a higher reflectance of reticle light and its associated lower transmission of the target light. If the target is dark, he moves to an area having a lower reflectance of reticle light; and as this lower reflectance area has a higher transmission character, more light reaches his eye from the target so that he can see it, and also see the reticle.

The second additional feature is a filter which can alternately be removed from or be placed in the pathway of the target view in front of the semi-transparent mirror to reduce the brightness of the target when it is unnecessarily bright. It is shown pivotally attached and halfway in position. It may be otherwise attached as desired.

The third additional feature to further facilitate the use of the sight under very extreme light conditions such as night-time is to provide an auxiliary energy light source.

Such an auxiliary energy source for reticle illumination is preferably a phosphorescent or other luminescent material activated by a radio active substance. Other auxiliary energy sources are apparent.

The reflective coating for the semi-transparent mirror may be constructed of the sharp-cutting multiple layer type interference filter coating used on many earlier types of reflex sights wherein the coating is capable of reflecting, for example, more than 50% of the orange reticle wave lengths while transmitting more than 50% of the green target wave lengths. This is sometimes referred to as a dichroic mirror.

Figure 2:
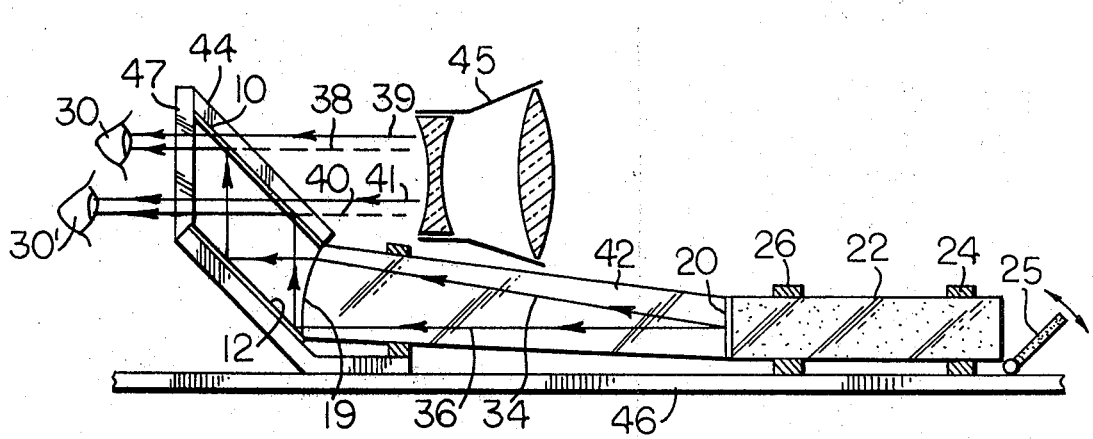
Figure 3:
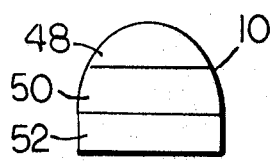

Numerous forms of the invention will suggest themselves as the invention is studied, some of which will be described in connection with the accompanying drawings, in which:

FIG. 1 is a diagrammatic showing of a reflex sight using a self luminous reticle and a beam splitter mirror coating inside an optical block, FIG. 2 is a diagrammatic showing of a reflex sight employing a beam splitter without the optical block, FIG. 3 is an alternate semi-transparent mirror beam splitter coating having a multi-intensity configuration for the mirror coating 10 of FIGS. 1 and 2, and FIGS. 4 and 5 are variations of pattern of the configuration shown in FIG. 3.

FIG. 1 shows the invention in diagrammatic showing where the reflex sight employs the semi-transparent mirror coating 10 on a flat surface of optical material and a fully reflective mirror coating 12 on a flat surface, with a refracting collimator optical surface 18. In this embodiment of the invention, I employ a solid block of optical material cut into two pieces 5, 7 to provide the angled reflectance coating 10 before assembly. Surfaces 16, 14 are essentially parallel to each other. The block is supported by member 32 which is attached to base 28. An elongated fluorescent illuminator 22 is attached to base 28 by brackets 26, 24. The illuminator has a dark faced, light transmitting indicia reticle 20 at one end. This reticle is viewed by observer's eye 30, 30' on light pathways 36, 34 which rays are collimated at surface 18, reflected at the highly reflective surface 12 and reflected at the semi-transparent mirror coating 10 to the observer's eye 30, 30'. Thus is provided a distant collimated image of the reticle 20.

The pathway area between refracting surface 18 and the reticle 20 can be covered or shielded to keep out unwanted dirt, etc., or can be occupied by solid optical material if a higher index lens is inserted in the pathway or if an air space is provided adjacent to surface 18 for collimation effect. A light filter 37 may be optionally provided to reduce very bright targets. The filter, for example, may be neutral gray, colored, a pair of adjustable Polaroid or other optical filters.

An auxiliary energy light source 25 is provided to be alternately moved into action to illuminate the reticle at night, or to be moved out of use for daytime sighting. It can instead be located below the illuminator, between the base 28 and the illuminator 22.

Referring yet to FIG. 1, the combination of refractive surface 18 and mirror coatings 12, 10 cause the reticle 20 to appear at a distance and to come from the direction shown by dotted lines 38, 40 along with the rays 39, 41 emitted by the target. The collimation effect of refractive surface 18 causes the reticle to be essentially parallax-free with the target and permits the observer's eye 30 to be moved to a different location 30' without a change of aim.

FIG. 2 shows an alternate beam splitter and collimator of the invention, in diagrammatic showing, where the reflex sight employs the semi-transparent mirror coating 10 on a flat surfaced optical body 44. The rays 34, 36 coming from the reticle face are passed by the optical body 42, collimated by the refractive surface 19, and reflected by the highly reflective surface 12 toward the semi-transparent mirror surface 10, which in turn directs the rays 34, 36 to the eye 30, 30'. The beam splitter 10 causes the rays 34, 36 to appear to come to the eye 30, 30' from the direction of the dotted lines 38, 40. The refracting surface 19 could be alternately placed in the pathway of the rays 34, 36 between the reflective coating 12 and the semi-transparent mirror 10. A base 46 is shown in association with the parts to orient them for clearer explanation purposes only. A solid optical body 42 completely occupies the space from the reticle 20 to the refractive surface 19 and passes the rays 34, 36. This serves to keep out unwanted dust and condensation. The solid optical body, however, can be deleted and a lens used at surface 19.

A plano powered piece of glass 47 serves to keep out dirt and water. A Galilean telescope 45 is shown to be used when target magnification is desired.

The mirror coating 10 in FIGS. 1 and 2 can be applied evenly to make a semi-transparent mirror having the intensity of reflection uniform over its entire surface area.

If, however, it is desirable to use the sight under extreme light conditions, or if it is desirable to use a less brilliant reticle and illuminator to prevent enemy detection, a configuration of semi-transparent mirror intensity shown in FIG. 3 may be used. That is to say, the mirror coating 10 of FIGS. 1 and 2 may be applied unevenly as shown in FIG. 3.

FIG. 3 is a flat view of the multi-intensity semi-transparent mirror coating 10 as seen by the observer's eye 30, 30', showing a high transmission and low reflection area 48, and a lower transmission and higher reflection area 50 than that of area 48 and a yet lower transmission and higher reflection area 52 than that of area 50. The demarcation between areas 48, 50 and 52 can be sharply defined or can be gradually blended from one to the other, or can be a continuous and even change of reflection-transmission ratio from the top to the bottom of the coating 10. Furthermore, the coating can be arranged in reverse order where the higher reflectance is at the top and the lower reflectance is at the bottom. Although FIG. 3 shows three different intensity areas, two properly chosen intensity areas work well for many conditions. More than three areas may, of course, be used if desired.

It has been found that different configurations of the two or more different ratios of reflection-transmission are advantageous for different applications such as for use on a shotgun, a bow and arrow, a rifle, etc. These configurations may consist of the type in FIG. 3, or of a type having a centrally located low reflection area with a peripheral higher reflection surround, or this may be reversed and have the higher reflection area centrally located. Any configuration of sharply defined edges or blended edges of areas desirable for a particular application may be used. Two other configurations are shown in FIGS. 4 and 5 to better illustrate this principle.

Figure 4:
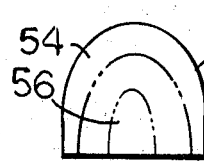

FIG. 4 is a flat view of the transparent mirror coating 10 as seen by the observer's eye 30, 30' in a different configuration where the high transmission and low reflection portion 54 is located on the top and down the sides around a more centrally located lower transmission and higher reflection portion 56. The border between portions 56 and 54 can be in one or in several well defined borders or be as shown where they gradually blend in percentage of reflection from one area to the other.

Figure 5:
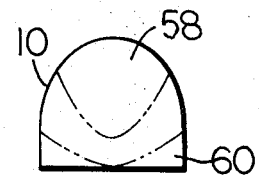

FIG. 5 is a flat view of the multi-intensity beam splitter coating 10 where it has its configuration in a general V-shaped form. Here area 60 has a higher reflectance which blends gradually to area 58 where a lower reflectance effect is present. A sharply defined border or borders may be used.

In general, it has been found that sharply defined borders between areas can be used more successfully for the reflex sight where the beam splitter mirror 10 is close to the eye, than can be used in a reflex sight where the reticle is between the observer and the beam splitter mirror, without making the beam splitter unduly large.

A gradually blended mirror is very useful, however, for the reflex sight in FIG. 1 for many uses.

The reticle 20 of FIG. 1 consists of a dark faced reticle of opaque nature having light transmitting indicia, or sighting indicia, lighted from behind the face by the illuminator 22. The illuminator 22 is an elongated bar of optical material containing fluorescent particles. As the bar is exposed to incident light, the fluorescent particles emit their light from the inside of the optical bar. The light so emitted is conducted by total internal reflection principles to the reticle indicia to make them appear to glow by self light. An orange-like color works well, and the commercial produce called Plexiglas, Yellow #2086 can be used. The elongated illuminator 22 can be shaped as a shet, block, etc., where it is desirable. This is further described in co-pending applications, Ser. Nos. 445,574 filed Apr. 4, 1965, 311,790 filed Sept. 26, 1963, and 447,483 filed Apr. 12, 1965.

It should be noted that although the term beam splitter means a device capable of dividing and directing a beam of light into two different directions, the beam splitter is used here, not to divide, but to cause two separate beams of light from separate directions to appear to have come from the same direction, and the word is used alternately to the term semi-transparent mirror for clarification.

Telescopic magnification as used in gun sights is generally a terrestial telescope consisting of at least a pair of plus powdered (convex) lenses for magnification with a pair of plus powered errector lenses between them to turn the image right side up. This type telescope is used because it has focal points inside the telescope where reticles can be placed and seen in focus with the target.

A so-called Galilean telescope or opera glass has no actual focal point inside or out of the telescope at which to place a reticle. This type of telescope can be easily and economically constructed up to three or four power and has an unusually wide field of view.

One feature of this invention is to incorporate Galilean telescopic magnification by making surface 16 of FIG. 1 a minus power and surface 14 of FIG. 1 a plus power. An alternate incorporation is to place a Galilean telescope or, if desirable, even a terrestial telescope on the line of sight between the observer's eye and the target, either on the target side of the semi-transparent mirror or on the observer's side of the semi-transparent mirror. A preferred form consists of a Galilean telescope on the target side of the semi-transparent mirror to obtain target magnification without reticle magnification, as shown in FIG. 2 and marked as item 45.

Such magnification equipment may be permanently or alternately attached.

It may be of help to understand the sight to say the reticle 20 acts as a front sight, or first sight element, and the collimator 18 acts as a rear sight, or second sight element, and either one may be moved to change the point of aim. The beam splitter permits the superimposition of the collimated reticle image and the target. The beam splitter parts can be moved to change aim, but it is preferred to move one of the sight elements.

While only one embodiment of the present invention has been illustrated and specifically described, many modifications and variations are possible and will become readily apparent to those skilled in the art from the foregoing description which is intended, therefore, to be illustrative only, and the scope of the invention is defined in the appended claims.

Having described my invention in its preferred form, what I claim is:

1. A reflex sighting device comprising in combination: sight indicia; collimating means for providing a collimated image of said sight indicia; and a semi-transparent mirror, said mirror having a ratio of reflection to transmission which is different in one area as compared to another area of said mirror, said mirror positioned to simultaneously reflect one of said collimated image and a more distant target to an observer while transmitting the other of said collimated image and the more distant target to the observer so that the observer can use the area of said mirror providing the most advantageous ratio of brightness between the target view and the collimated image of said sight indicia to see the target and said sight indicia image superimposed under a particular lighting condition.

2. The reflex sighting device of claim 1 wherein said semi-transparent mirror comprises a dichroic interference coating.

3. The reflex sighting device of claim 1 further comprising fluorescent means adapted to illuminate said sight indicia.

4. The reflex sighting device of claim 1 wherein said semi-transparent mirror is a plane mirror and said collimating means is a refractive collimating means.

5. The reflex sighting device of claim 2 wherein said semi-transparent mirror comprises a dichroic interference coating having a reflection maximum in the wave length emitted by the fluorescent means.

References Cited

UNITED STATES PATENTS

| | | | |
|---|---|---|---|
| 683,203 | 9/1901 | Grubb | 356—251 |
| 2,120,654 | 6/1938 | Spence et al. | 352—91 |
| 2,780,130 | 2/1957 | Mauer | 356—251 |
| 2,852,974 | 9/1958 | Nobles | 350—174 |
| 2,961,918 | 11/1960 | Nadig et al. | 352—84 |
| 3,043,181 | 7/1962 | Brown et al. | 95—42 |
| 3,230,819 | 1/1966 | Noxon | 350—174 |
| 3,282,178 | 11/1966 | Nelson | 95—42 |
| 3,320,671 | 5/1967 | Rickert et al. | 350—10 |

RONALD L. WIBERT, Primary Examiner

O. B. CHEW, II, Assistant Examiner